United States Patent
Groleau

(10) Patent No.: US 9,011,679 B2
(45) Date of Patent: Apr. 21, 2015

(54) APPARATUS FOR WASTE WATER TREATMENT

(76) Inventor: Martin Groleau, Québec (CA)

( * ) Notice: Subject to any disclaimer, the term of this patent is extended or adjusted under 35 U.S.C. 154(b) by 481 days.

(21) Appl. No.: 13/394,390

(22) PCT Filed: Sep. 9, 2010

(86) PCT No.: PCT/CA2010/001411
§ 371 (c)(1),
(2), (4) Date: Jun. 26, 2012

(87) PCT Pub. No.: WO2011/029191
PCT Pub. Date: Mar. 17, 2011

(65) Prior Publication Data
US 2012/0255891 A1    Oct. 11, 2012

Related U.S. Application Data

(60) Provisional application No. 61/272,295, filed on Sep. 9, 2009.

(51) Int. Cl.
C02F 3/06    (2006.01)
C02F 3/30    (2006.01)
C02F 3/10    (2006.01)
C02F 3/12    (2006.01)
C02F 1/28    (2006.01)

(52) U.S. Cl.
CPC ............. *C02F 3/301* (2013.01); *C02F 1/283* (2013.01); *C02F 3/101* (2013.01); *C02F 3/1242* (2013.01); *C02F 2203/006* (2013.01)

(58) Field of Classification Search
CPC .......... C02F 3/06; C02F 3/101; C02F 3/1242; C02F 3/301; C02F 2203/006
USPC .................. 210/150, 151, 605, 615
See application file for complete search history.

(56) References Cited

U.S. PATENT DOCUMENTS

| | | | | |
|---|---|---|---|---|
| 977,965 | A | * | 12/1910 | Paul .............................. 210/150 |
| 3,327,855 | A | * | 6/1967 | Watson et al. ................ 210/202 |
| 3,563,888 | A | * | 2/1971 | Klock ........................... 210/150 |
| 4,028,245 | A | | 6/1977 | Stahler |

(Continued)

FOREIGN PATENT DOCUMENTS

| | | |
|---|---|---|
| CA | 2078575 A1 | 10/1991 |
| CA | 2638258 A1 | 3/2009 |

OTHER PUBLICATIONS

International Search Report: mailed Dec. 7, 2010; PCT/CA2010/001411.

*Primary Examiner* — Christopher Upton
(74) *Attorney, Agent, or Firm* — Ladas & Parry LLP

(57) ABSTRACT

An apparatus for treating water comprises a conduit assembly for receiving waste water from a downstream inlet and for providing treated water out of an upstream outlet. The conduit assembly comprises a plurality of substantially vertical conduits in fluid communication providing for water to flow in an alternating downward and upward pathway therein. A medium for providing bacterial growth being is mounted within the conduit assembly. The medium comprises a plurality of substrate surfaces stacked along the vertical length of at least one conduit. Each substrate surface extends along the width of the conduit and provides for bacterial growth thereon. The apparatus includes a housing defining at least one chamber for receiving the conduit assembly therein.

21 Claims, 11 Drawing Sheets

(56) References Cited

U.S. PATENT DOCUMENTS

| | | | |
|---|---|---|---|
| 4,122,011 A * | 10/1978 | Strigle, Jr. | 210/150 |
| 4,620,929 A * | 11/1986 | Hofmann | 210/617 |
| 4,710,295 A * | 12/1987 | Zabel | 210/532.2 |
| 5,384,178 A | 1/1995 | Rye | |
| 6,207,047 B1 * | 3/2001 | Gothreaux | 210/150 |
| 6,224,756 B1 * | 5/2001 | Hongo | 210/150 |
| 6,440,304 B2 * | 8/2002 | Houck et al. | 210/532.2 |
| 6,730,226 B2 * | 5/2004 | Takada | 210/630 |
| 7,083,324 B2 * | 8/2006 | Van Drie | 210/150 |
| 2009/0065412 A1 * | 3/2009 | Mbarki et al. | 210/151 |
| 2011/0070636 A1 * | 3/2011 | Dalsgaard | 435/298.1 |

* cited by examiner

APPARATUS FOR WASTE WATER TREATMENT

CROSS-REFERENCE TO RELATED APPLICATIONS

The present application claims priority on U.S. Provisional Patent Application No. 61/272,295 filed on Sep. 9, 2009 and incorporated herein by reference in its entirety.

TECHNICAL FIELD

The present disclosure relates to the treatment of waste water. More specifically but not exclusively, the present disclosure relates to an apparatus for waste water treatment.

BACKGROUND

In certain areas water treatment is provided in small scale sewage treatment systems using septic tanks. Septic tanks provide an anaerobic bacterial environment that develops in the tank decomposes or mineralizes the waste discharged therein. Septic tanks can be coupled with other on-site wastewater treatment units such as biofilters or aerobic systems. Periodic maintenance is required to remove the solids which settle and gradually fill the tank.

A septic tank includes a tank in fluid communication with an inlet at one end and a drain at the other end. The tank usually includes two chambers separated by a dividing wall. One chamber allows for solids to settle and scum to float, the other chamber receives the excess fluid and allows for further settlement. Remaining impurities can be eliminated in the soil, with the excess water can be eliminated through a piping network. The entire septic system can operate by gravity alone. Two-stage septic systems provide for sludge to be digested in a separate tank.

OBJECTS

An object of the present disclosure is to provide an apparatus for waste water treatment.

An object of the present disclosure is to provide a medium for bacterial growth for an apparatus for waste water treatment.

An object to the present disclosure is to provide a conduit assembly for an apparatus for waste water treatment.

SUMMARY

In accordance with an aspect of the disclosure, there is provided an apparatus for treating water comprising:

a conduit assembly for receiving waste water from a downstream inlet and for providing treated water out of an upstream outlet, the conduit assembly comprising a plurality of substantially vertical conduits in fluid communication providing for water to flow in an alternating downward and upward pathway therein; and a medium for providing bacterial growth being mounted within at least one of the plurality of vertical conduits, the medium comprising a plurality of substrate surfaces stacked along the vertical length of the at least one conduit, each substrate surface extending along the width of the at least one conduit and providing for bacterial growth thereon, wherein the medium provides for treating waste water.

In accordance with an aspect of the disclosure, there is provided an apparatus for treating water comprising:

a housing defining at least one chamber and including an upstream inlet for receiving waste water and an upstream outlet for expelling water; and a conduit assembly mounted within the at least one chamber and being in fluid communication with the inlet and the outlet, the conduit assembly comprising a plurality of substantially vertical conduits in fluid contiguity providing for water to flow in an alternating downward and upward pathway therein, the conduit assembly providing for receiving therein a medium for providing bacterial growth, wherein the waste water is treated within the conduit assembly and the treated water is expelled through the outlet.

In accordance with an aspect of the disclosure, there is provided a medium for bacterial growth for a water treatment apparatus having a plurality of interconnected vertical conduits comprising:

a plurality of substrate surfaces for being mounted within a given vertical conduit such that the substrate surfaces are stacked along the vertical length of the at least one conduit, each substrate surface extending along the width of the at least one conduit and providing for bacterial growth thereon.

In accordance with an aspect of the disclosure, there is provided a conduit assembly for an apparatus for waste water treatment comprising at least one chamber, a water inlet and a water outlet, the conduit assembly comprising:

a plurality of substantially vertical conduits in fluid contiguity with a given vertical conduit being fluid communication at its top end thereof to an adjacent vertical conduit and at its bottom end thereof to another adjacent vertical conduit thereby providing for water to flow in an alternating downward and upward pathway therein, the conduit assembly providing for receiving therein a medium for providing bacterial growth, the conduit assembly defining an inlet opening at one end thereof an outlet opening at the other end thereof, wherein the conduit assembly is removably mountable within the at least one chamber such that the inlet opening is in fluid communication with the water inlet and the outlet opening is in fluid communication with the water outlet.

In an embodiment, each substrate surface comprises a disc having opposite surfaces faces. In an embodiment, the opposite surfaces comprise top and bottom faces. In an embodiment, each disc comprises a wavy surface structure between the opposite surfaces. In an embodiment, the outer edge of the disc comprises openings leading to the wavy surface structure. In an embodiment, the stacked discs are spaced apart from one another. In an embodiment, the discs are spaced apart via spacers therebetween. In an embodiment, at least one of the opposite surfaces comprises disconnected walls protruding therefrom. In an embodiment, the walls are radially positioned on the at least one surface. In an embodiment, the opposite surfaces comprise top and bottom faces, at least one of the top and bottom faces comprising the walls. In an embodiment, both the top and bottom faces comprise the walls. In an embodiment, the walls provide for spacing the stacked discs from each other. In an embodiment, the disc comprises a pathway formed between the walls. In an embodiment, the pathway comprises a labyrinth-like configuration. In an embodiment, the stacked discs comprise perforations. In an embodiment, the discs comprise a respective central hole for receiving a support therethrough. In an embodiment, the discs are integrally connected to each other thereby defining a medium column.

In an embodiment, the substrate surfaces comprise a respective hole for receiving a support therethrough. In an embodiment, the substrate surfaces are spaced apart. In an embodiment, the substrate surfaces are spaced apart via spacers therebetween. In an embodiment, the substrate surfaces are integrally connected to each other thereby defining a medium column. In an embodiment, the substrate surfaces comprise respective disconnected walls protruding therefrom. In an embodiment, the substrate surface comprises a pathway formed between the walls. In an embodiment, the pathway comprises a labyrinth-like configuration. In an embodiment, the substrate surfaces comprise perforations. In an embodiment, the substrate surfaces are delimited by a respective peripheral wall comprising openings.

In an embodiment, a support is provided, the plurality of stacked substrate surfaces mounted to the support. In an embodiment, the support extends vertically within the at least one conduit. In an embodiment, the support comprises tubular member. In an embodiment, the support comprises perforations along the length thereof, the support being in fluid communication with an air supply so as to provide air to the substrate surfaces.

In an embodiment, a plurality of the vertical conduits comprise a medium for bacterial growth therein. In an embodiment, an air supply for provides air to at least some of the plurality of vertical conduits, thereby providing for aerobic bacterial growth therein. In an embodiment, the other of the conduits provide for anaerobic bacterial growth therein. In an embodiment, the conduit assembly provides for the water to flow upwardly in a given downstream the conduit and then downwardly in the next adjacent upstream the conduit and for water to flow downwardly in a given downstream the conduit and then upwardly in the next adjacent upstream the conduit. In an embodiment, a given vertical conduit is in fluid communication at its top end thereof to an adjacent vertical conduit and its bottom end thereof to another adjacent vertical conduit In an embodiment, a given conduit is fluid communication with its adjacent upstream and downstream conduits via its top end thereof and it bottom end thereof or its bottom end thereof and its tope end thereof.

In an embodiment, the apparatus comprises a housing, the housing defining at least one chamber, the conduit assembly being mounted within at least the one chamber. In an embodiment, the conduit assembly comprises respective inlet and outlet openings and is mounted within a support structure, the support structure with the conduit assembly being removably mountable within the at least one chamber so that the inlet opening is in fluid communication with the inlet and the outlet opening is in fluid communication with the outlet. In an embodiment, the housing comprises at least one additional chamber being in fluid communication with the at least one chamber. In an embodiment, the housing comprises a plurality of additional chambers being in fluid communication with each other and the at least one chamber.

In an embodiment, the conduit assembly comprises respective inlet and outlet openings and is mounted within a support structure, the support structure with the conduit assembly being removably mountable within the at least one chamber so that the inlet opening is in fluid communication with the inlet and the outlet opening is in fluid communication with the outlet.

According to an aspect of the present disclosure, there is provided an apparatus for treating water comprising:

a downstream chamber having a water inlet so as to receive waste water therein;

an upstream chamber being in fluid communication with the downstream chamber thereby receiving waste water therefrom; and a conduit assembly mounted within the upstream chamber for receiving waste water therefrom and comprising a plurality of substantially vertical conduits in fluid communication so as to provide for the water to flow upwardly in a given downstream conduit and then downwardly in the adjacent upstream conduit, the conduit assembly being in fluid communication with a water outlet, wherein the conduit assembly provides for a bacterial environment to develop therein for treating the waste water.

In an embodiment, a median chamber is positioned between the downstream and upstream chambers and is in fluid communication therewith, In an embodiment, air is injected in the vertical conduits that provide for water to flow upwardly therein.

According to an aspect of the present disclosure, there is provided an apparatus for treating water comprising:

a conduit assembly for receiving waste water from a downstream inlet and for providing treated water out of an upstream outlet, the conduit comprising a plurality of substantially vertical conduits in fluid communication so as to provide for the water to flow upwardly in a given downstream conduit and then downwardly in the adjacent upstream conduit; and a medium for providing bacterial growth being mounted within at least one of the plurality of vertical conduits, the medium comprising a longitudinal support extending within the conduit for carrying a plurality of stacked disc members having respective central holes to receive the support therethrough.

In an embodiment, the vertical support is a perforated tube member for allowing air ejection there through.

In accordance with an aspect of the disclosure there is provided an apparatus for treating water comprises a downstream chamber with a waste water inlet and an upstream chamber in fluid communication therewith so as to receive waste water therefrom. A conduit assembly is mounted within the upstream chamber for receiving waste water therefrom. The conduit assembly comprises a plurality of substantially vertical conduits in fluid communication so as to provide for the water to flow upwardly in a given downstream conduit and then downwardly in the adjacent upstream conduit. The conduit assembly being is in fluid communication with a water outlet and provides for a bacterial environment to develop therein for treating the waste water.

Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with an embodiment of the present disclosure, there is provided a water treatment device that includes at least one chamber with a conduit assembly for receiving water, treating the water and expelling the treated water. The conduit assembly includes a plurality of vertical conduits which are interconnected at their top and bottom ends so as to form a contiguous and serpentine pathway. A medium for bacterial growth is positioned within the conduit assembly. This medium includes a plurality of vertically stacked substrate surfaces provided by discs mounted on a longitudinal tube that can include perforations for discharging air on these substrate surfaces.

Figure 1:
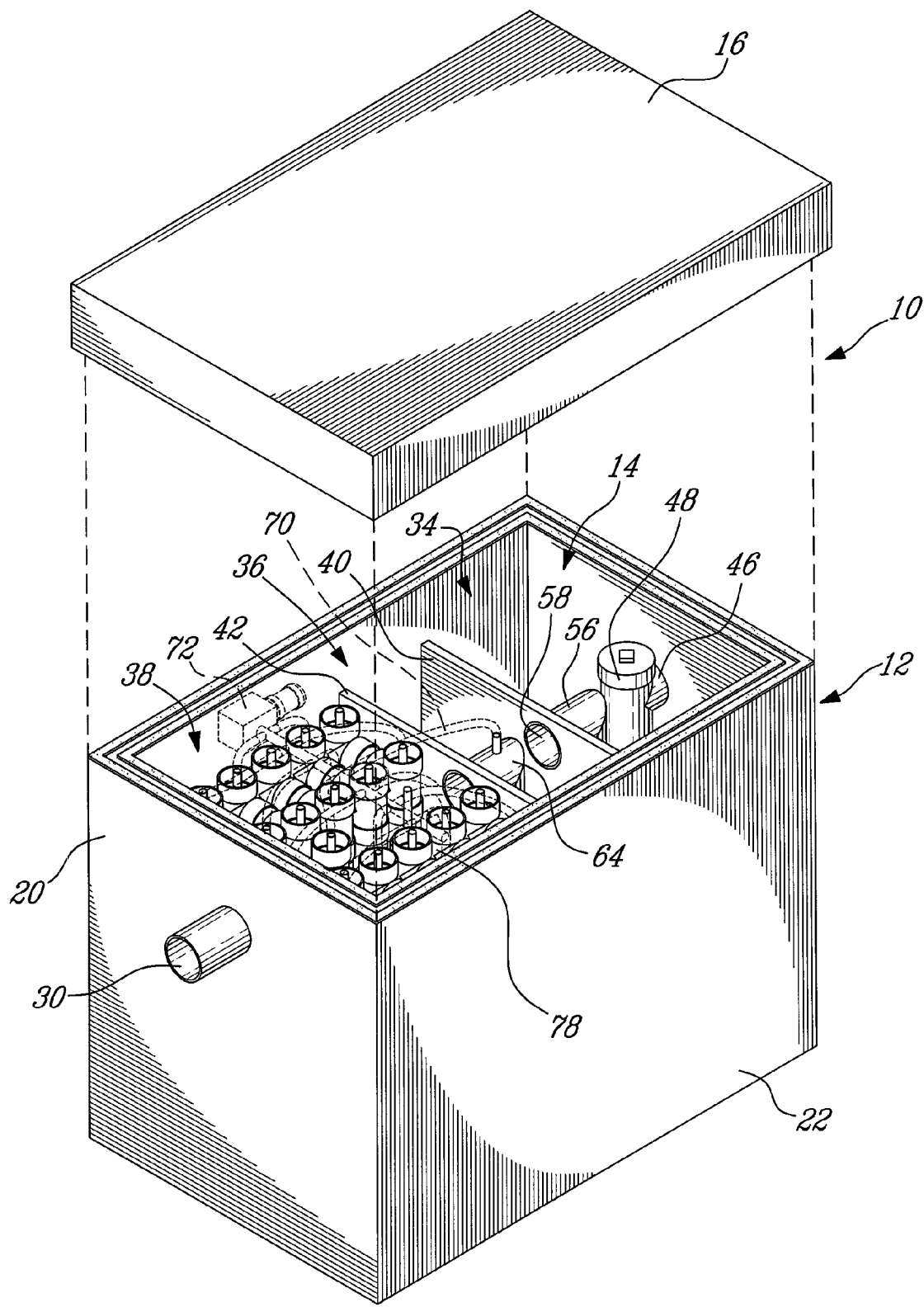
FIG. 1 is a perspective view of the apparatus for waste water treatment in accordance with a non-restrictive illustrative embodiment of the present disclosure.
Figure 2:
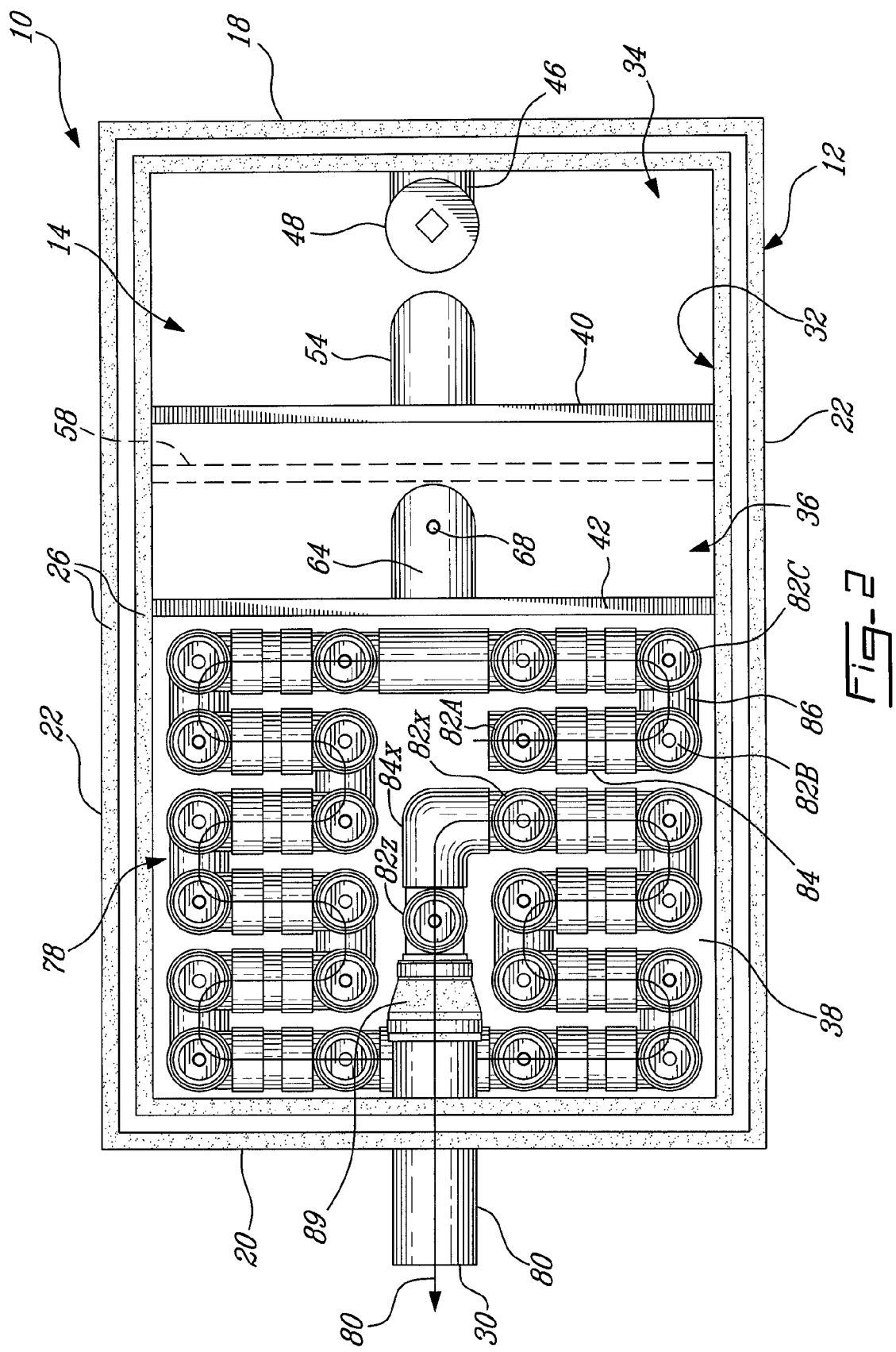
FIG. 2 is a top plan view of the apparatus of FIG. 1.
Figure 3:
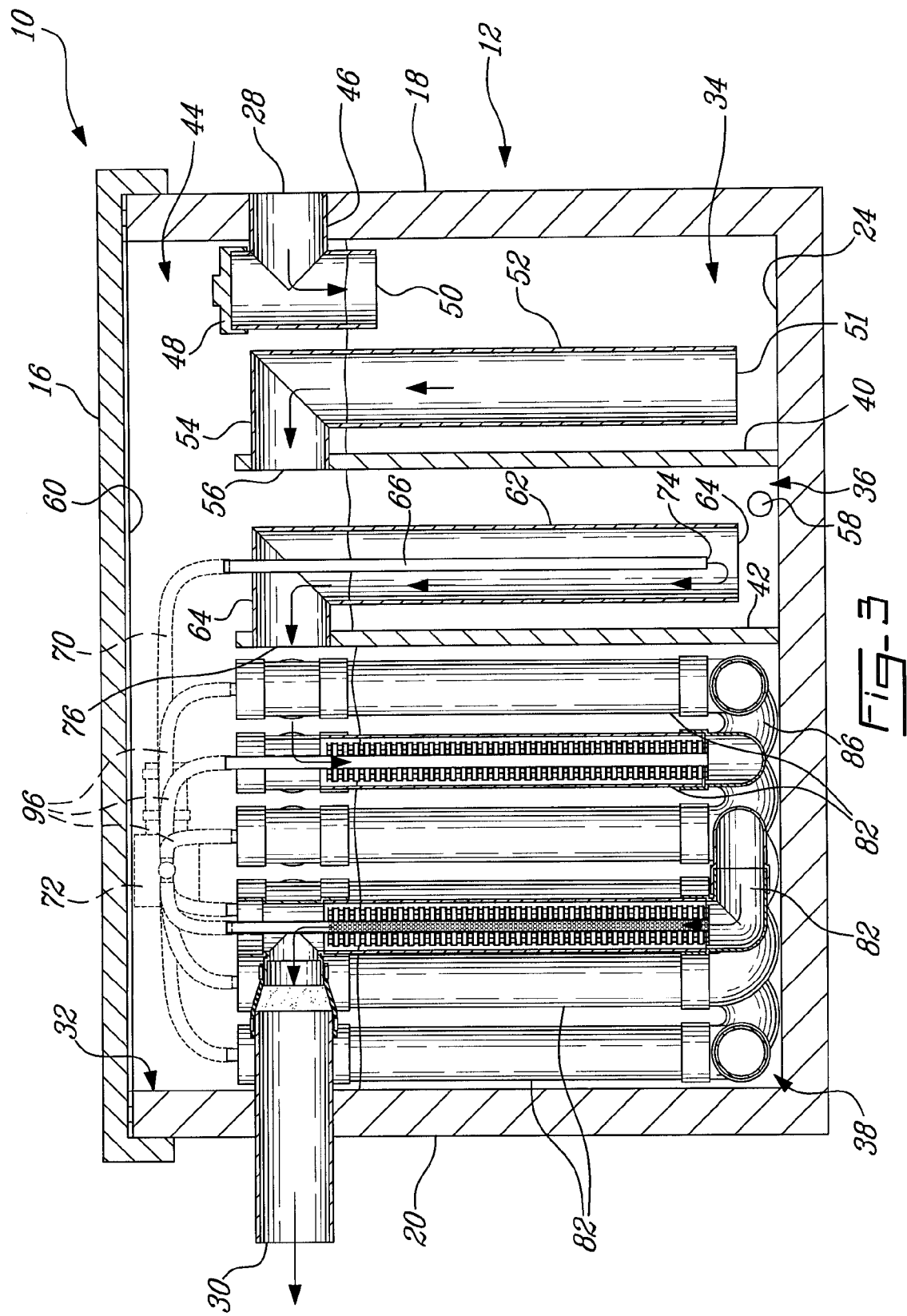
FIG. 3 is a lateral sectional view of the apparatus of FIG. 1.

FIGS. 1, 2 and 3 show the apparatus 10 including a generally rectangular housing 12 having a top opening 14 that can be closed by a cover 16 thereby providing a compact enclosed structure. The housing 12 includes a front or downstream wall 18, an opposite rear or upstream wall 20, lateral sides 22 as well as a bottom floor 24. The housing 12 is made of a double membrane structure 26 and thereby can be fully sealed when the cover 16 is mounted thereto.

The apparatus 10 includes a water inlet 28 at its downstream end 18 and a water outlet 30 at its upstream end 20.

The housing 12 defines a top rim 32 as well as first, second and third chambers 34, 36 and 38 respectively. More specifically, chamber 36 is a median chamber and is upstream the first chamber 34. Chamber 38 is upstream from chamber 36 and is larger in size than the other two chambers. Chamber 34 is separated by the chamber 36 via a divider wall 40 and chamber 36 is separated from chamber 38 by a divider wall 42. The divider walls 40 and 42 have a similar height that is beneath the height of the rim 32 thereby providing on open top space 44.

Water enters through inlet 28 into pipe 46 which leads to a vertical exit pipe 48 providing a header space above the down flowing water tube 46 which comes out of opening 50 and falls by gravity into the chamber 32. As water continues to flow into chamber 32 it rises upwardly into a longitudinal vertical conduit 52, via opening 51, and flows therefrom into a contiguous horizontal conduit 54 and out of outlet 56 where it falls, by gravity, into the chamber 36.

Chamber 36 includes a bottom hose 58 which provides for air ejection therein. The foregoing causes carbon emission from the water which is deposited on the portion 60 of cover 16 right above chamber 36. As such, section 60 may include carbon absorbing material which is periodically removed. As water continues to flow from chamber 32 to chamber 36, the water therein rises upwardly into conduit 62 via a bottom opening 64 and flows therefrom into a contiguous horizontal conduit 64.

Conduit 62 includes a vertical tube 66 extending therein along the vertical longitudinal length thereof. The tube 66 protrudes from a top opening 68 in conduit 62 in order to be mounted to a hose 70 that receives air from air supply 72 fixed within the housing 12. Of course, the air supply 72 can be positioned outside of the housing 12 as will be further explained with reference to the embodiment shown in FIG. 8.

The tube 66 includes a bottom opening 74 for releasing air within the conduit 62 thereby providing the water therein with air.

The water within conduit 62 flows into the horizontal section 64 thereof and out of an outlet 76 leading into the chamber 38.

Chamber 38 includes a contiguous serpentine conduit assembly or pipe arrangement 78 to allow water to flow therein as shown by the pathway 80

The serpentine conduit assembly 78 includes a plurality of longitudinal vertical conduits 82 being alternately connected to each other by a short top bridge conduit 84 and by a short bottom conduit 86 and as such providing a contiguous flow as shown by pathway 80 within the conduit assembly 78 in an up and down serpentine fashion. More specifically, a first vertical conduit 82A includes a primary opening similar to the openings of conduit 62 and 52 in order to receive water therein as its rises within chamber 36.

The water from the initial vertical conduit 82A will then flow to its adjacent vertical conduit 82B via a bridge 84 therebetween. Water within vertical conduit 82B flows downwardly into a bottom conduit 86 and then upwardly into the adjacent vertical conduit 82C and so on and so forth in a serpentine and zigzag like fashion leading towards a conduit 82X. Water falls downwardly in conduit 82X into an L-shaped bottom conduit 84X towards the final vertical conduit 82Z where water flows therein in an upward fashion. Water flows out of conduit 82Z and into an elongated horizontal conduit 88, via connector 89, and finally out of the outlet 30 defined by conduit 88.

The three chambers 34, 36 and 38 allow for solids to settle therein along the bottom floor 24. The serpentine conduit assembly 78 provides a bacterial environment for digesting the remaining solids. This latter step will be described in greater detail with reference to FIGS. 4, 5, 6 and 7.

Figure 4:
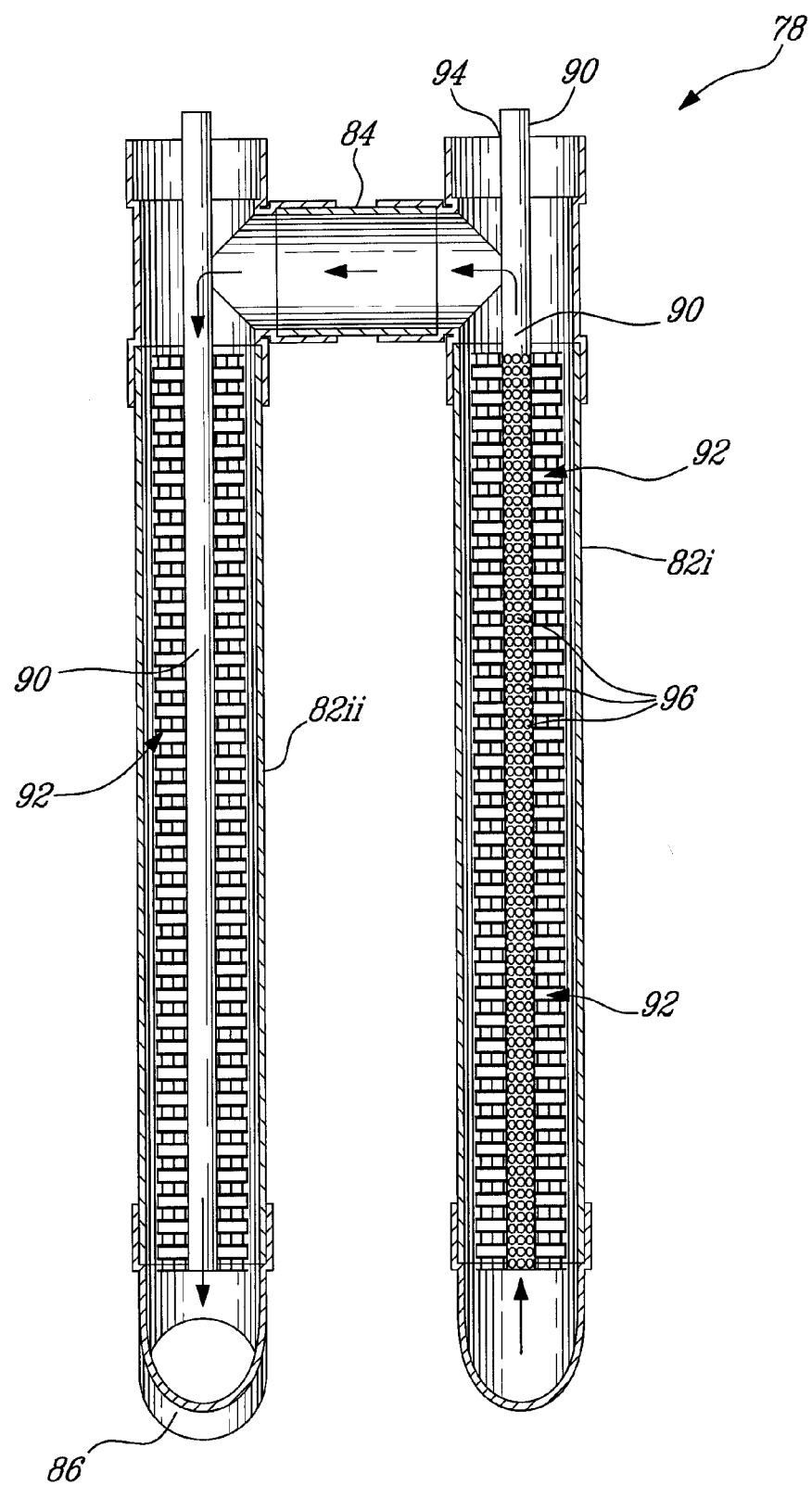
FIG. 4 is a partial view of the serpentine conduit assembly used in the apparatus for waste water treatment in accordance with a non-restrictive illustrative embodiment of the present disclosure.

With respect to FIG. 4, there shown a pair of interconnected vertical conduits. A first downstream vertical conduit 82i is filled with water flowing upwards therein. Water then pass through a bridge conduit 84 which is in fluid communication with a second upstream vertical conduit 82ii in which water flows in the downward direction therein to flow into a subsequent vertical conduit 82 via the bottom passage conduit 86.

Conduit 82i is representative of all the conduits 82 of the serpentine assembly 78 in which water flows upwardly therein.

Figure 5:
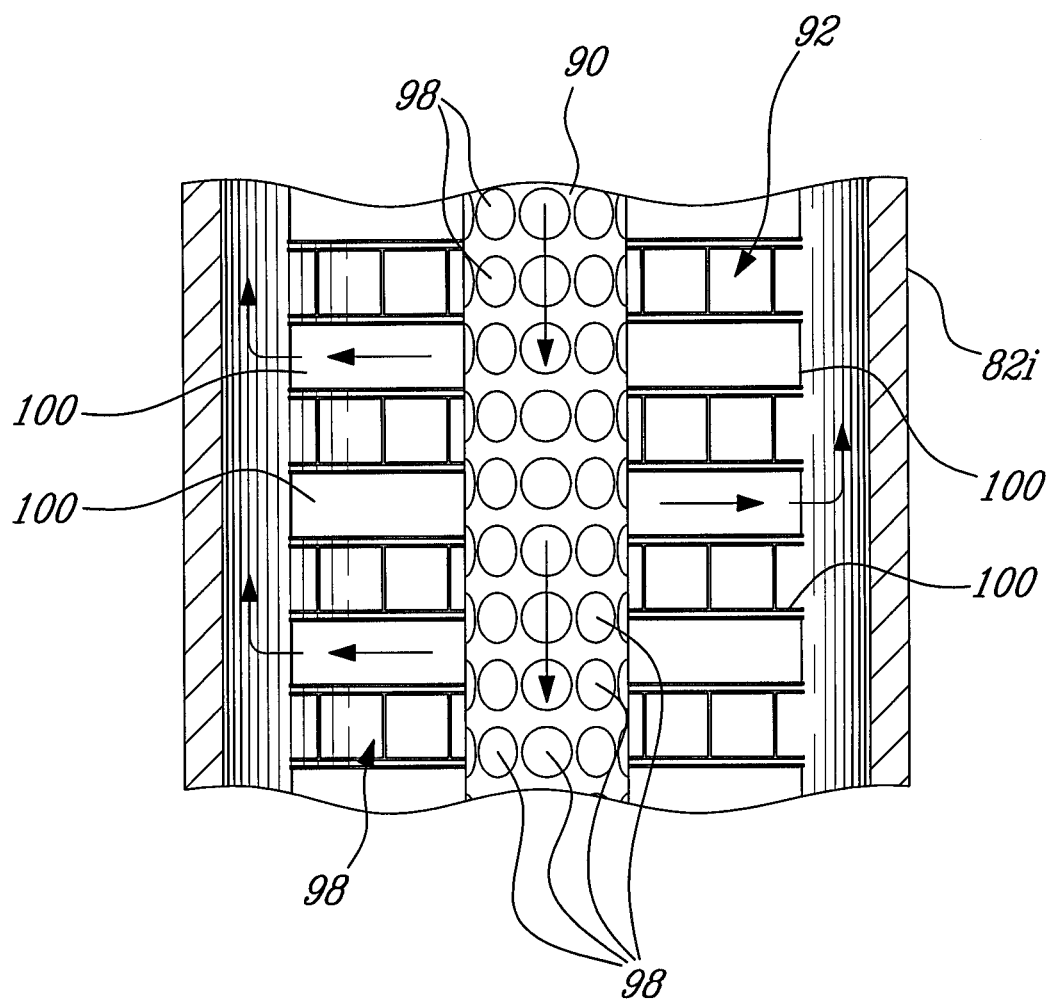
FIG. 5 is an enlarged view of a portion of vertical conduit of the serpentine conduit assembly of FIG. 4.

Conduit 82i includes a longitudinal tube 90 extending therein with a medium 92 for bacterial growth mounted thereto. The tube 90 protrudes from a top opening 94 of the conduit 82i and is contiguous with a hose 96 (see FIG. 3) mounted to the air supply 72. As such, air is pumped into the hollow tube 90 and ejected therefrom by way of perforations 98 formed along the body of the tube 90. Turning to FIG. 5, the arrows indicate the outflow of air from perforations or holes 98 through the tube 90 so as to provide air to the medium 92 for aerobic bacterial growth.

The upstream vertical conduit 82ii is representative of all the conduits 82 of the serpentine assembly 78 in which water flows downwardly therein.

Conduit 82ii includes a longitudinal tube 91 extending therein and having a medium 92, for bacterial growth, mounted thereon. Tube 91 is similar to tube 90 except that it does not include any air perforations and as such is not mounted to a hose 96. The tube 91 and medium 92 provide for anaerobic bacterial growth.

Figures 6, 7:
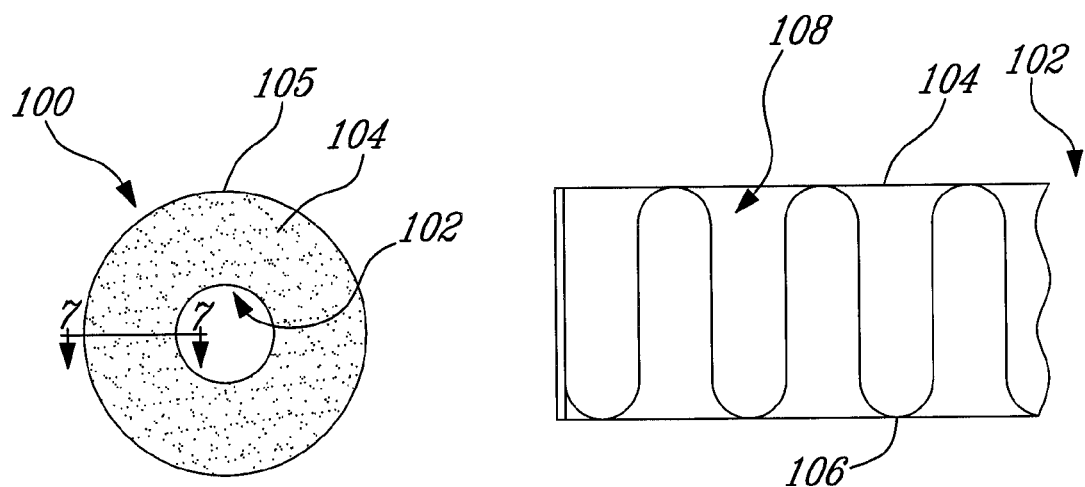
FIG. 6 is a top plan view of the disc medium positioned within the conduits of the serpentine conduit assembly of FIG. 4, in accordance with a non-restrictive illustrative embodiment of the present disclosure.
FIG. 7 is side sectional view of a substrate surface disc taken along line 7-7 of FIG. 6.

With respect to FIGS. 5, 6 and 7, the medium 92 comprises a plurality of vertically stacked substrate surfaces provided by discs 100 having central holes 102 for fitting the tubes 90 or 91 therethrough. The discs 100 include top and bottom faces 104 and 106 as well as a wavy structure 108 there between which provide a greater surface area or bacterial growth. The outer perimeter 105 of the discs is at least partially open to allow access to the wavy structure 108.

As is know in the art, the bacterial growth on the medium 92 provides for digesting the solids within the water that passes through the serpentine assembly 78 thereby treating the water.

Figure 8:
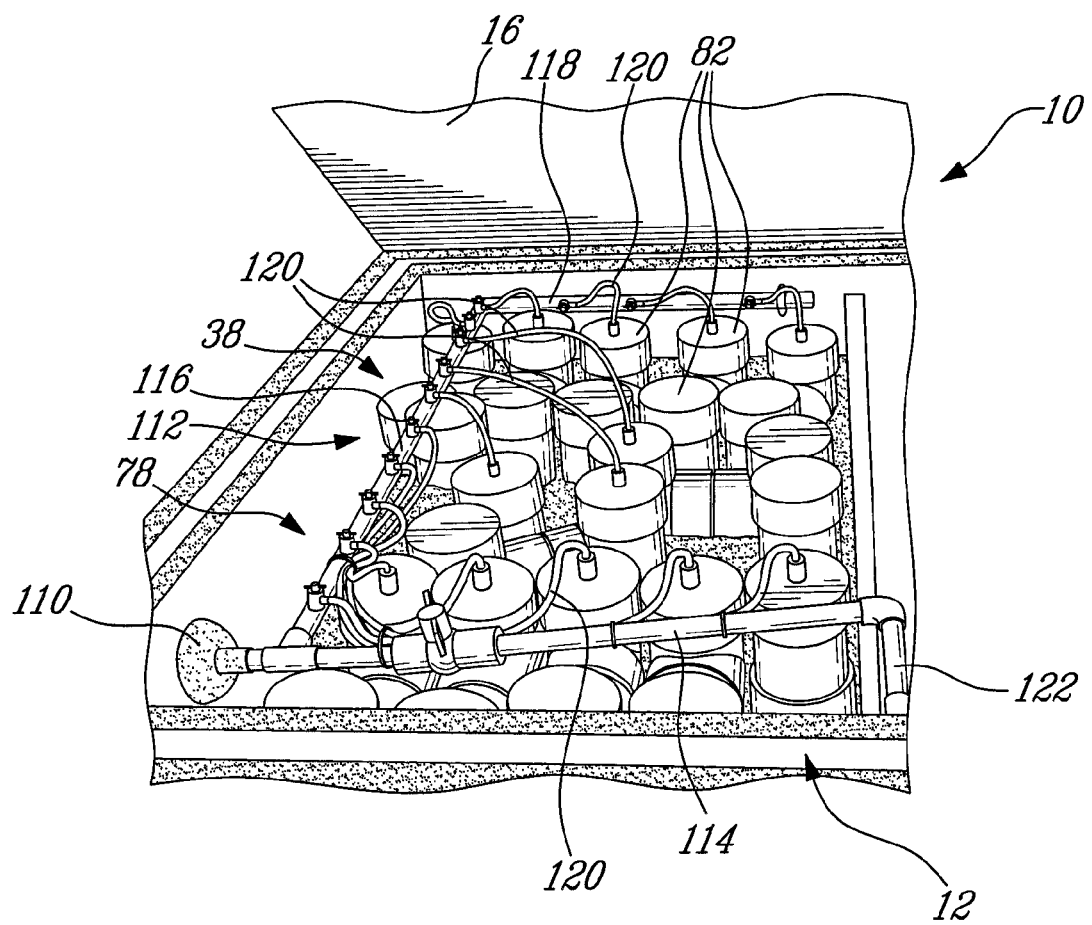
FIG. 8 is a perspective view of an apparatus for waste water treatment in accordance with another non-restrictive illustrative embodiment of the present disclosure.

FIG. 8 shows another embodiment of how air can be provided to the serpentine assembly 78. An external air supply (not shown) is connected via a passage 110 within housing 12 to an air pipe assembly 112 including three pipes 114, 116 and 118 positioned along the inner walls of chamber 38 for feeding the conduits 82 with air via hoses 120. A vertical tube 122 is connected to the tube 114 so as to provide a bottom hose (hose 58 previously discussed) with air.

Figure 9:
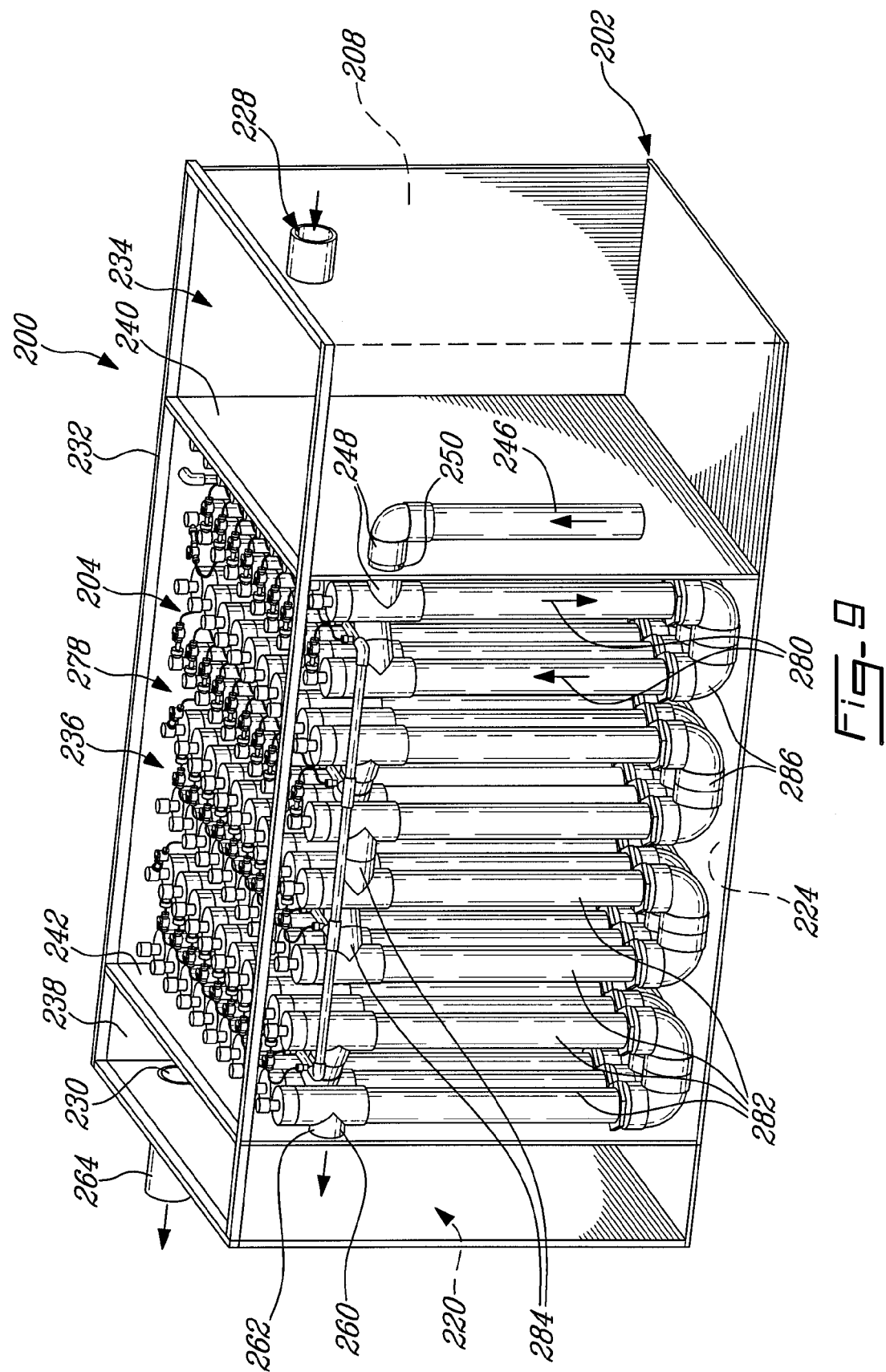
FIG. 9 is a perspective of an apparatus for waste water treatment in accordance with a further non-restrictive illustrative embodiment of the present disclosure.
Figure 10:
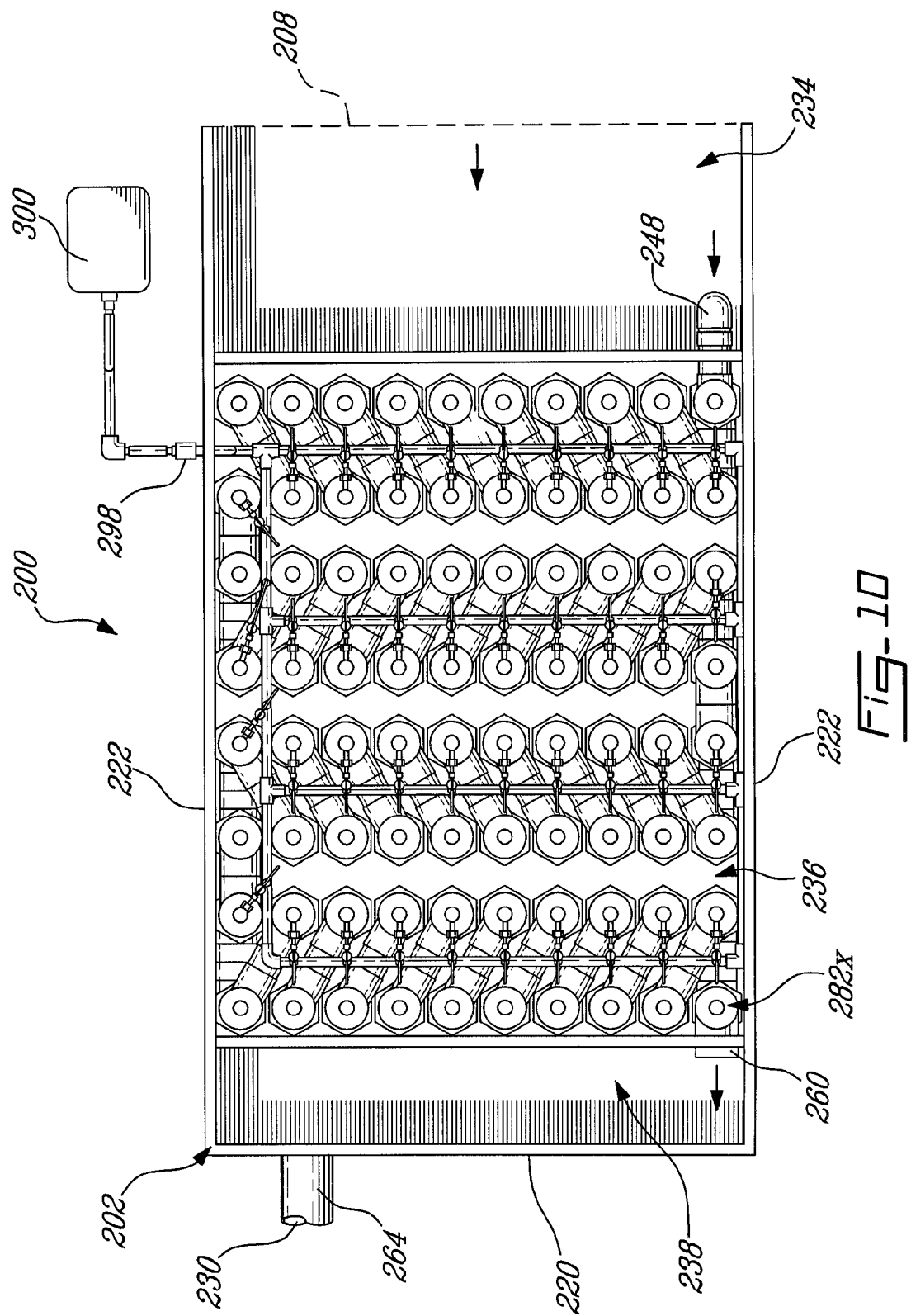
FIG. 10 is a top plan view of the apparatus of FIG. 9.

FIGS. 9 and 10 show an apparatus 200 including a generally rectangular housing 202 having a top opening 204 that can be closed by a cover (not shown) thereby providing a compact enclosed structure. The housing 202 includes a front or downstream wall 208, an opposite rear or upstream wall 220, lateral sides 222 as well as a bottom floor 224.

The apparatus 200 includes a water inlet 228 at its downstream end 208 and a water outlet 230 at its upstream end 220.

The housing 202 defines a top rim 232 as well as first, second and third chambers 234, 236 and 238 respectively. More specifically, chamber 236 is a median chamber and is upstream the first chamber 234. Chamber 138 is upstream from chamber 236 and is smaller in size than the other two chambers. Chamber 234 is separated by the chamber 236 via a divider wall 240 and chamber 236 is separated from chamber 238 by a divider wall 242.

Figure 11:
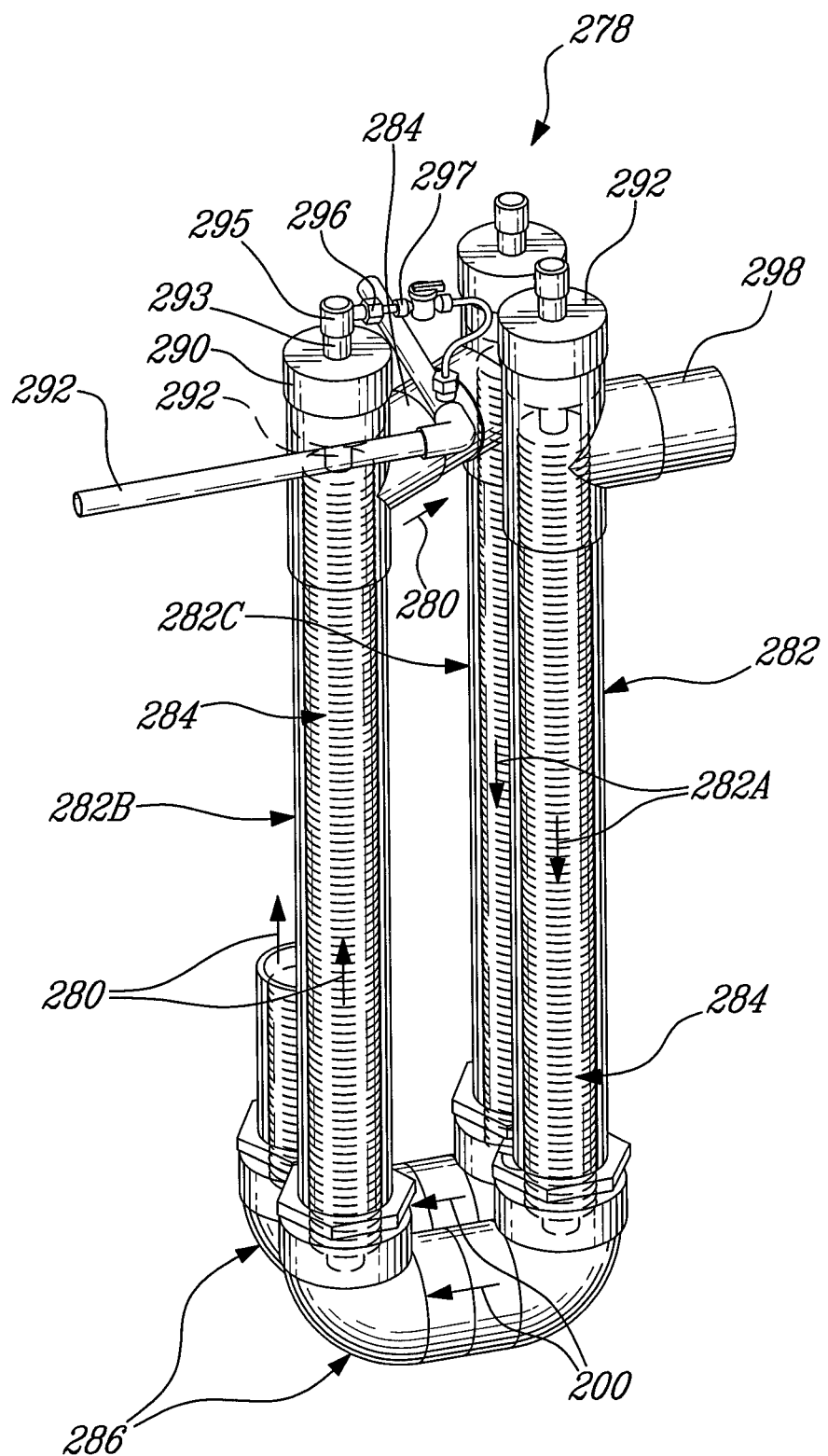
FIG. 11 is a partial perspective view of the conduit assembly of the apparatus of FIG. 9.

Water enters through inlet 228 into the first chamber 234 filling the chamber and flowing upwardly into pipe 246 which leads to a horizontal exit pipe 248 that protrudes, via an opening 250 in the wall 242, into chamber 236 so as to be in fluid communication with a contiguous serpentine conduit assembly or pipe arrangement 278 providing for water to flow as shown by arrows 280 (see also FIG. 11).

With reference to FIGS. 9, 10 and 11, the serpentine conduit assembly 278 includes a plurality of longitudinal vertical conduits 282 being alternately connected to each other by a short top bridge conduit 284 and by a short bottom conduit 186 and as such providing a contiguous flow as shown by pathway 280 within the conduit assembly 278 in an alternating upward and downward serpentine fashion.

More specifically, a first vertical conduit 282A includes a primary opening or inlet that is contiguous with pipe 248 and water flows downwardly therein to then flow to its next upstream vertical conduit 282B via a bottom 186 therebetween. Water within vertical conduit 282B flows upwardly into a top bridge conduit 284 and then downwardly into the next upstream conduit 282C and so on and so forth in a serpentine and zigzag like fashion leading towards a conduit 282X (see FIG. 10).

Water from the conduit 282X flows into chamber 238 via conduit 260 which protrudes into the chamber 238 via an opening 262 in wall 240. As water fills up the chamber 238 it escapes via a pipe 264, that is contiguous with the water outlet 130 and that protrudes out of chamber 138 via an opening 166 in wall 120.

Figures 12, 13:
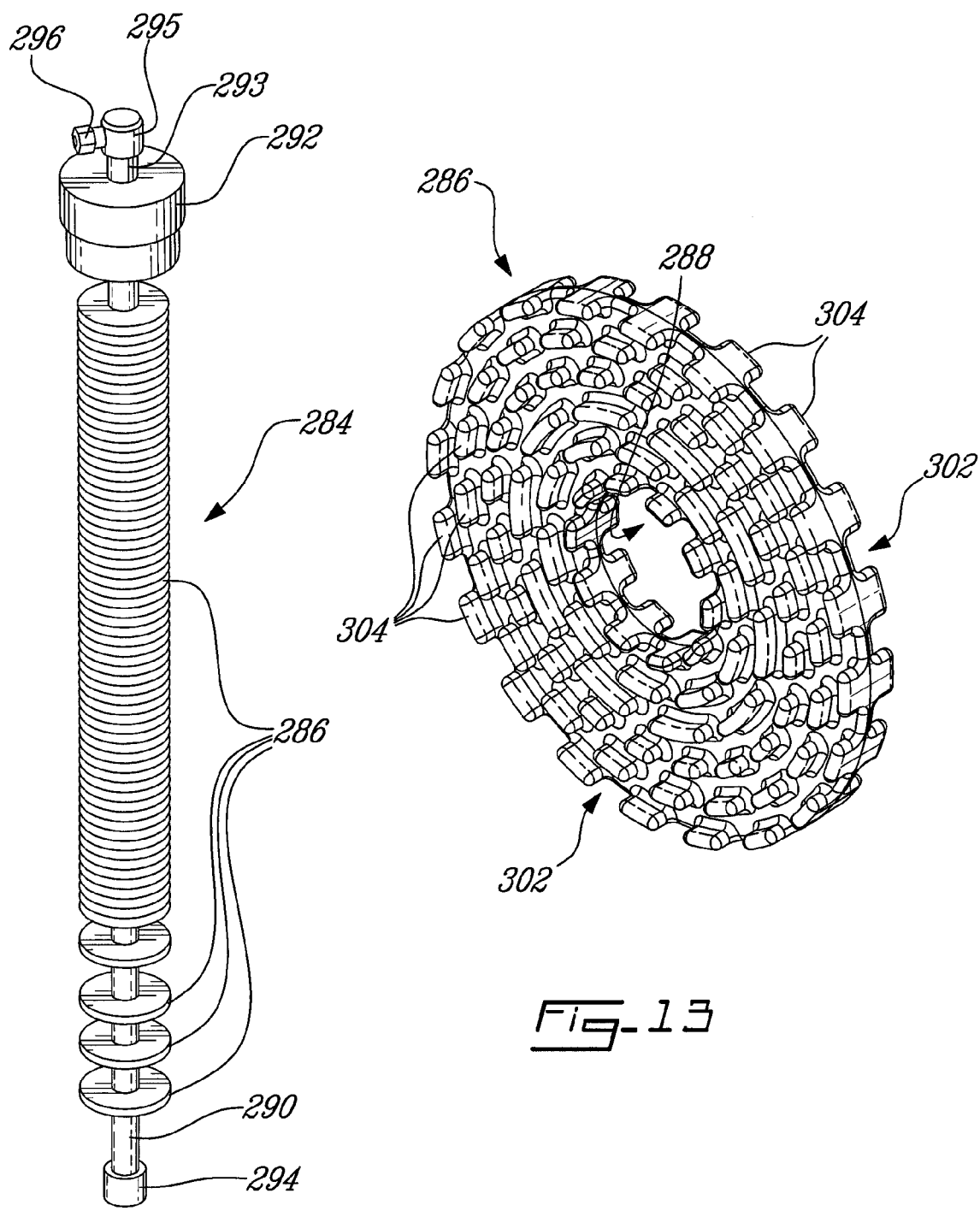
FIG. 12 is a perspective view of the medium for bacterial growth for the conduit assembly of Figure.
FIG. 13 is a perspective view of the substrate surface disc of the medium of FIG. 12.

As shown in FIGS. 11 and 12, the conduits 282 include a respective medium 284 providing for bacterial growth. The medium 284 includes a plurality of substrate surfaces 286, vertically stacked along the vertical length of their respective conduit 282. Each substrate surface 286 extending along the width of their respective conduit 282. In this example, the substrate surfaces 286 are provided by discs.

With respect to FIGS. 12 and 13, the discs 286 have a central hole 288 and are mounted to a longitudinal tube 290 mounted and extending within a conduit 282. The tube 390 includes a cap 292 neat its top end 293 for sealing the conduit 282 and a stopper 294 at its bottom end to hold the stack of discs 286. The top end 293 of the tube 290 protrudes from the cap 292 and includes another stopper 295.

Some of the tubes 290 includes a short inlet pipe 296 at their top end 293 for being in fluid communication with a hose 297 that branches out of an air pipe 298 which is fluid communication with an air supply 300 (see FIG. 1). As such, some of the tubes 290 receive air which escapes out of perforations along their lengths in order to provide air to the substrate disc surfaces 286. Some of the tubes 290 do not receive air and as such may or may not have the foregoing perforations. Therefore, the medium 282 provides for both anaerobic and aerobic bacterial growth as mentioned above.

Figure 14:
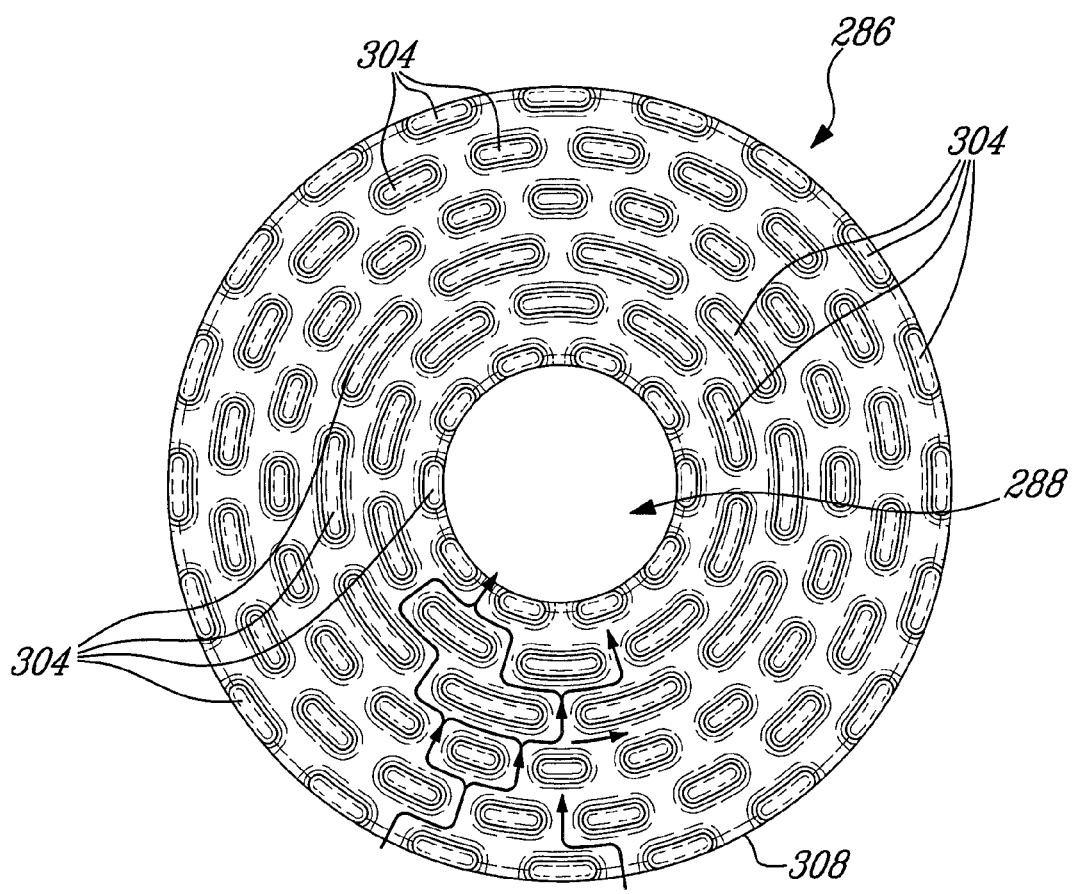
FIG. 14 is top plan view of the disc of FIG. 13, the bottom plan view being a mirror image thereof.
Figure 15:
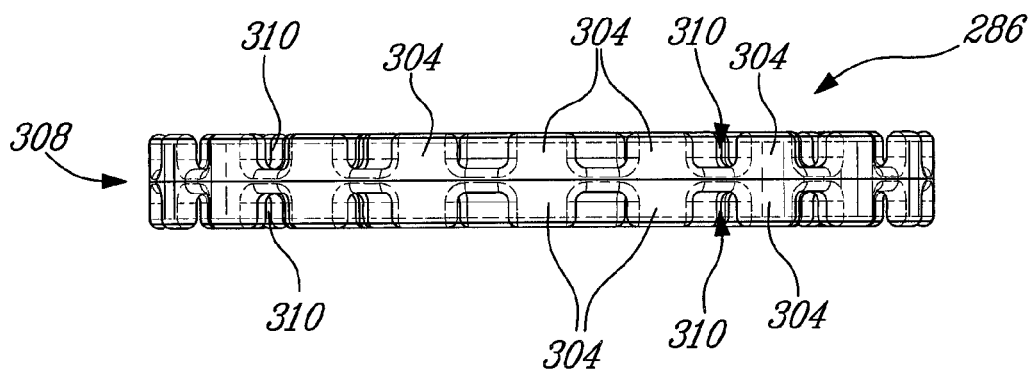
FIG. 15 is lateral view of the disc of FIG. 13, the front and rear views being mirror images thereof.

Turning now to FIGS. 13, 14 and 15, the disc 286 includes a central hole 388 as well as similar opposite surfaces 202. Each surface 202 includes a plurality of radially disposed protruding short walls 304. Walls 304 are provided in different lengths and may be provided in different heights and thicknesses to define therebetween a labyrinth-like pathway 306 for the water as it seeps between the walls 304 towards the hole 288. All or at least some of the walls 304 of the stacked discs 286 abut each other and as such act as spacers for between surfaces 302. More particularly, a the upwardly extending walls 304 of a given disc 286 will abut the downwardly protruding walls of its next adjacent upper disc 286, while the downwardly extending walls 304 of this same given disc 386 will abut the upwardly protruding walls of its next adjacent lower disc 286.

The disc 286 includes a perimeter 308 having openings 310 defined by the walls 304 along the perimeter 310.

In another embodiment, the medium 282 is a column made of interconnected discs 286, these discs can be interconnected via some or all of their walls 304 or other connecting portions therebetween, thus providing for the holes 288 to define a tubular formation for receiving tube 290. The foregoing allows for easier mounting and removal of a medium column 282.

The foregoing configurations of the substrate surfaces 286 provide a greater surface are for bacterial growth. As is know in the art, the bacterial growth on the medium 282 provides for digesting the solids within the water that passes through the conduit assembly 278 thereby treating the water.

The housings 12 and 202 of the apparatuses 10 and 200, respectively, have been illustrated with three chambers, the skilled artisan can easily contemplate a greater or lesser number of chambers, as well as a greater number of conduit assemblies 78 or 278. Furthermore, the conduit assemblies 78 and 278 can be provided in the form of removable units that can be supported within a structural support such as a box structure provided in glass or plastic for example with an inlet opening at one end and an outlet opening at the other end so as to be put into fluid communication with the inlets and outlets of the housings.

The various features described herein can be combined in a variety of ways within the context of the present disclosure so as to provide still other embodiments. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of disclosure and not limitation. Hence, although the present disclosure has been provided hereinabove by way of non-restrictive illustrative embodiments thereof, it can be modified, without departing from the scope, spirit and nature of the appended claims.

What is claimed is:

1. An apparatus for treating water comprising:
    a conduit assembly for receiving waste water from a downstream inlet and for providing treated water out of an upstream outlet, said conduit assembly comprising a plurality of substantially vertical conduits in fluid communication providing for water to flow in an alternating downward and upward pathway therein; and
    a medium for providing bacterial growth being mounted within at least one of said plurality of vertical conduits, said medium comprising a plurality of substrate surfaces stacked along the vertical length of said at least one conduit, each said substrate surface extending along the width of said at least one conduit and providing for bacterial growth thereon, each said substrate surface comprising a disc having opposite surfaces, each said disc comprising a wavy surface structure between said opposite surfaces,
    wherein said medium provides for treating waste water.

2. An apparatus according to claim 1, wherein said opposite surfaces comprise top and bottom faces.

3. An apparatus according to claim 1, wherein said disc comprises an outer edge comprising openings leading to said wavy surface structure.

4. An apparatus according to claim 1, wherein said stacked discs are spaced apart from one another.

5. An apparatus according to claim 1, wherein at least one of said opposite surfaces comprises disconnected walls protruding therefrom.

6. An apparatus according to claim 5, wherein said walls are radially positioned on said at least one of said opposite surfaces.

7. An apparatus according to claim 5, wherein said opposite surfaces comprise top and bottom faces, at least one of said top and bottom faces comprising said walls.

8. An apparatus according to claim 5, wherein said disc comprises a pathway formed between said walls.

9. An apparatus according to claim 1, wherein said stacked discs comprise perforations.

10. An apparatus according to claim 1, wherein said discs comprise a respective central hole for receiving a support therethrough.

11. An apparatus according to claim 1, wherein said discs are integrally connected to each other thereby defining a medium column.

12. An apparatus according to claim 1, wherein said substrate surfaces are delimited by a respective peripheral wall comprising openings.

13. An apparatus according to claim 1, further comprising a support, said plurality of stacked substrate surfaces mounted to said support.

14. An apparatus according to claim 13, wherein said support extends vertically within said at least one conduit.

15. An apparatus according to claim 13, wherein said support comprises tubular member.

16. An apparatus according to claim 13, wherein said support comprises perforations along the length thereof, said support being in fluid communication with an air supply so as to provide air to said substrate surfaces.

17. An apparatus according to claim 1, further comprising an air supply for providing air to at least some of said plurality of vertical conduits, thereby providing for aerobic bacterial growth therein.

18. An apparatus according to claim 17, wherein the other of said conduits provide for anaerobic bacterial growth therein.

19. An apparatus according to claim 1, wherein said conduit assembly provides for the water to flow upwardly in a given downstream said conduit and then downwardly in the next adjacent upstream said conduit and for water to flow downwardly in a given downstream said conduit and then upwardly in the next adjacent upstream said conduit.

20. An apparatus according to claim 1, wherein said apparatus comprises a housing, said housing defining a chamber, said conduit assembly being mounted within at least said one chamber.

21. An apparatus according to 20, wherein said conduit assembly comprises respective inlet and outlet openings and is mounted within a support structure, said support structure with said conduit assembly being removably mountable within said chamber so that said inlet opening is in fluid communication with said inlet and said outlet opening is in fluid communication with said outlet.

* * * * *